Nov. 6, 1962 L. B. READ 3,062,448
FUEL MIXTURE CONTROL FOR INTERNAL COMBUSTION ENGINES
Filed Oct. 3, 1958
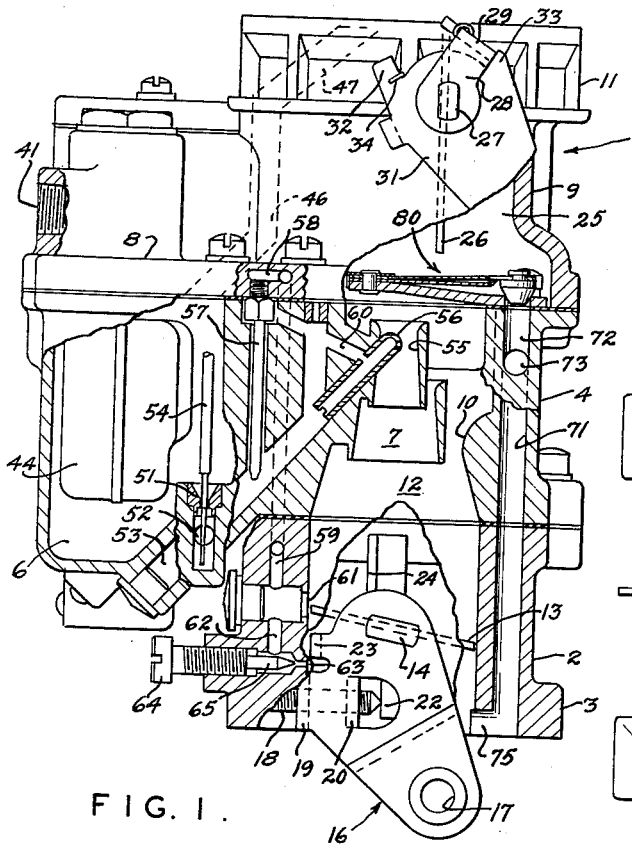
FIG. 1.
FIG. 5.
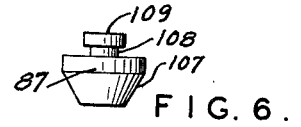
FIG. 6.
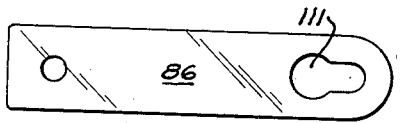
FIG. 7.
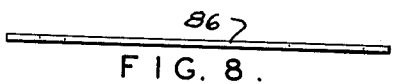
FIG. 8.
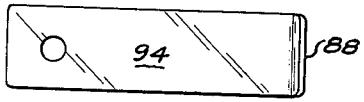
FIG. 9.
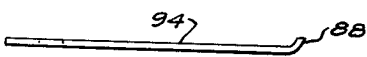
FIG. 10.
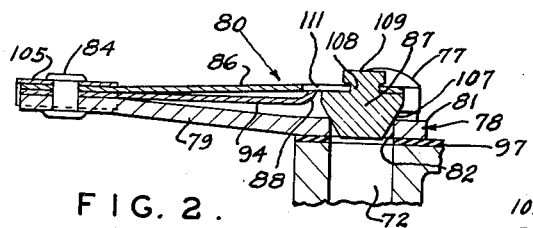
FIG. 2.
FIG. 3.
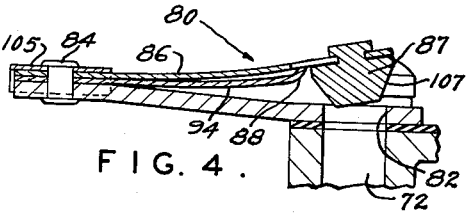
FIG. 4.
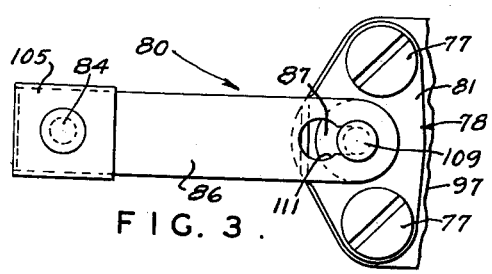
INVENTOR.
LELAND B. READ
BY
*Laurena M. Goodridge*
ATTORNEY United States Patent Office 3,062,448
Patented Nov. 6, 1962

3,062,448
FUEL MIXTURE CONTROL FOR INTERNAL COMBUSTION ENGINES
Leland B. Read, Florissant, Mo., assignor to ACF Industries, Incorporated, New York, N.Y., a corporation of New Jersey
Filed Oct. 3, 1958, Ser. No. 765,170
7 Claims. (Cl. 236—93)

This invention relates to fuel-air mixture controls for fuel metering devices in an engine induction system, which controls are responsive to variations in air or mixture temperatures and pressures to effect changes in the fuel-air ratio to improve engine economy and engine operation. More specifically, this invention relates to an air metering valve for an engine induction system which is preferably incorporated in the carburetor structure and is automatic in operation, inexpensive to construct, and easily assembled.

The operational advantage of this invention can best be understood when explained in relation to actual engine fuel requirements. Most piston engines for automotive use require a rate of fuel supply proportional to the rate of air supplied in order to operate, and the induction system for such engines must include fuel metering means which supplies the proper fuel-to-air ratio for all operating conditions of the engine. This is the function of the carburetor part of the engine induction system, and the mixture delivered from the carburetor to the engine manifold must, where conditions are constant, correspond with fixed proportions of fuel and air required by the engine.

In addition, the engine cannot burn liquid fuel, but only a mixture of air and fuel in vapor form. Thus it follows that the function of the carburetor is to supply air and fuel, not only in the proper proportions, but also to perform at least the initial mixing of air and fuel. In order to vaporize the fuel, however, heat must be added to the mixture. The source of heat is usually a "hot spot" in the intake manifold of the engine induction system. Since the carburetor and manifold are connected, the carburetor itself is heated, which drives off vapors from the fuel in the carburetor through the carburetor vents into the engine induction system. These vapors, of course, are unmetered, and tend to enrich the fuel mixture.

It might also be pointed out here that the "hot spot" has a temperature control only, so that the temperature of the mixture depends upon gas velocity over the "hot spot." Thus, at low rates of mixture flow, velocities are low but mixture temperatures are correspondingly higher. As a result, the fuel vapor is heated to higher temperature and expands in the induction system to displace the air and change the mixture ratio supplied by the carburetor.

In addition to these factors, it must also be realized that under-hood temperatures vary over a wide range, affecting air density, and thereby also affecting the ratio between the weight of fuel and the weight of air metered by the carburetor.

Of course, it is well understood that temperature control of mixture ratio is not new. Automatic chokes compensate for low temperatures by enriching the mixture in a range of low engine temperatures when the air is cold. This invention, however, is effective under exactly opposite conditions when the air temperatures under the hood are above, say 100° entering the carburetor, and the engine is at normal operating temperatures or above. This invention also operates almost exactly in reverse to an automatic choke mechanism, since, instead of throttling the air flow to produce an increase in pressure drop and an increase in the fuel flow through the idle system and main nozzle, this invention, broadly, is directed at increasing the air flow into the system without increasing the suction and fuel flow from the idle system or from the main nozzle, which in turn is favorable to produce a leaner fuel mixture at high temperatures, and also at lower pressures.

Broadly speaking, this result can be attained by any means for adding supplementary air to the induction system of the engine; in other words, by an auxiliary air supply leading to the engine induction system, which auxiliary air supply by-passes the fuel metering mechanism of the carburetor. From this specification, the invention becomes readily understood, and, in the form disclosed, is embodied in the carburetor itself. This is preferable, since the air supplied to the carburetor is generally through an air cleaner, and thus, by incorporating the invention within the carburetor, only filtered air enters the engine induction system.

The carburetor described in this specification is provided with a by-pass passage extending around the high and low speed fuel metering systems to an outlet below the carburetor throttle; in other words, from the air horn through the carburetor body to an outlet below the throttle valve. The flow of air through this by-pass is automatically metered, and this metering means is responsive to increases in air temperature to increase the air flow through the by-pass. In the specific form disclosed according to this invention, the metering means is a valve mounted on a thermostat spring in such a way as to open when temperature increases and vice versa. The particular manner of mounting also results in a valve which is responsive to air pressure drop thereacross and, consequently, to changes in engine intake air pressures.

This application is a continuation-in-part of my prior application Serial No. 705,983, filed December 30, 1957, now Patent No. 2,986,380, and discloses, for the first time, a simplified construction for this metering valve.

As stated in the prior application, an object of this invention is broadly to effect a change in mixture ratio supplied to the engine by a novel metering system controlling the total air supply to the engine induction system independently of the metering system used to control fuel flow, whaever that form may be.

Another object of the invention is to provide a novel mixture control for an engine in which air flow is metered separately from fuel flow.

Another object of this invention is to provide a novel improved temperature responsive valve suitable for the purposes above specified.

Another object of the invention is to provide a novel improved temperature responsive metering valve which is simple and inexpensive to manufacture and is dependable in operation and easy to calibrate.

Another object of this invention is to provide a novel simple improved device which will avoid rough idling operation of the engine at high temperatures or high altitude.

Additional objects and advantages of this invention will become apparent from the following description taken with the accompanying drawings, in which, FIG. 1 is a side elevation, partly in section, illustrating a dual carburetor provided with this invention.

FIG. 2 is an enlarged sectional view of the air metering valve for this system.

FIG. 3 is an enlarged top plan view of the same valve in FIG. 2 illustrating the mode of mounting and the construction thereof.

FIG. 4 is a view similar to FIG. 2 illustrating the valve in open position.

FIGS. 5–10, inclusive, are top and side elevational views, respectively, illustrating each of the elements in the valve construction.

Referring to the drawings, FIG. 1 illustrates an operative environment of the invention and one modification of and air valve assembly for use with this embodiment. The carburetor shown as illustrating the environment is a dual carburetor and selected for purposes of illustration only. The number of mixture conduits in the carburetor has nothing to do with the invention except to illustrate that it is preferable to locate the separate air circuit adjacent the mixture conduit and extending around the high and low speed fuel metering systems in the carburetor. This air circuit and valve may be placed anywhere in the carburetor where it is convenient and forms the least obstruction to accessibility.

The dual carburetor 1, illustrated, includes a throttle body 2 with an attaching flange 3 to secure the carburetor to an intake manifold of an engine (not shown). The body of the carburetor 4 is mounted on the throttle body and includes a fuel chamber 6 containing a float 44 for operating a needle valve controlling the flow of fuel through the connection inlet 41 to maintain a constant level of fuel within the bowl 6. On the carburetor body 4 is a combined float bowl cover 8 and air horn 9 having a reinforced rim 11 to which the air cleaner (not shown) is secured. The carburetor body 4 contains a pair of mixture conduits 12, one of which is shown, and these mixture conduits, in turn, extend through the throttle body 2. Pivotally mounted in the mixture conduits 12 are a pair of throttle valves 13 (one of which is shown) on a throttle shaft 14 journaled in the throttle body and extending across each mixture conduit.

In this particular carburetor the closed position of the throttle valves 13 is controlled by a fast idle adjusting screw 18 threaded in a pair of lugs 19 and 20 struck from the metal of primary throttle lever 16 which is secured to throttle shaft 14. Idle set screw 18 may be used to control the setting of the throttles 13 and, in turn, the engine idling speed, but it should be understood that it may be entirely desirable to eliminate the function of the idle screw 18 and allow the throttles 13 to close tightly, in which case the mixture for idle can be supplied in other well known ways, such as, for example, through an idle air by-pass provided around the throttle valve. Such a by-pass is normally provided with a separate metering screw for controlling the amount of air flowing therethrough during idle operation, as illustrated, for example, in the Brown Patent 2,376,228.

Control lever 16 has an eye 17 for receiving a control linkage, in turn connected to the manual control for the operator. This control linkage is normally biased in a direction to close the throttle valves 13, usually by spring pressure. When idle screw 18 is used, spring pressure will close the throttles until the end of the idle screw 18 strikes a lug 22 on the throttle body. On the other hand, the wide open position of the throttle valves 13 may be adjusted by a lug 23 which is positioned to engage a stop 24, also on the throttle body.

The air horn 9 has an air inlet passage 25 mounting a choke valve 26 rotatable by means of a mounting shaft 27 journaled in the sides of the air horn 9. The choke shaft 27 rotatably mounts a choke control lever 31 with projecting lugs 32 and 33, between which projects a lug 29 on the end of an arm 28 secured to the choke shaft 27. A torsion spring 34 on the choke shaft 27 has its ends engaged with lugs 32 and 29 so as to tend to maintain the lugs 29 and 33 in engagement. This spring will permit opening of the choke valve by engine suction when the lever 31 is moved in a direction to urge the choke valve closed.

The particular choke mechanism shown is a manual type, but it should be understood that it may be replaced by any automatic choke control of a known type.

An internal vent passage 46 leads from the top of the fuel bowl 6 into the air horn, and this passage terminates in a pitot tube 47 forming an inside vent means for the fuel bowl. This vent maintains a pressure in the fuel bowl 6 the same as the air pressure at the inlet to the air horn 9.

This carburetor contains two main fuel systems and two idling fuel systems or low speed fuel systems, but, since both are identical, only one of each type of system is shown and will be described hereinafter.

Adjacent the bottom of the fuel bowl 6 is a metering jet or orifice 51 controlled by a metering rod 54. The metering rod in turn may be moved by either throttle operation or by a step-up piston controlled by manifold suction, all in a manner well known in the art. Metering jet 51, in turn, controls the flow of fuel from the fuel bowl 6 into a main fuel passage 52 which in turn connects with main fuel passage 53 inclined upwardly to a fuel nozzle 56 located in a boost venturi 55. The boost venturi is concentrically arranged within the secondary venturi 7 which is, in turn, similarly located with respect to main venturi 10 so that each venturi is aspirated in turn by the action of the succeeding venturi. Nozzle 56 may have suitable anti-percolating passages and bleeds such as shown at 60, all of which form no part of the present invention and will not be described in detail.

The low speed fuel metering circuit comprises an idle tube 57 projecting into communication with the main fuel passage 53 through a suitable well. The opposite end of the tube communicates with a cross passage 58 which may include suitable metering restrictions and bleeds omitted here for the sake of clarity. Cross passage 58 in turn connects by means of vertical passage 59 with an outlet port 61 located adjacent the edge of the throttle 13 and by a vertical passage 62 with a port 63 opening below or downstream of the throttle 13. Idle port 63 is in turn provided with an idle metering screw 64 which is adjustable by means of screw threads to move the metering needle 65 with respect to the outlet of the port 63 and control the amount of fuel delivered.

During high speed operation, the throttle 13 will be open and the fuel will be supplied primarily from the primary nozzle 56. During low speed operation, the throttle 13 is closed, or nearly closed, and the fuel is supplied primarily from the idle port 63. During the transition from idle to open throttle operation, the throttle 13 gradually uncovers the port 61 to provide supplemental fuel to that delivered from the port 63 so as to increase the fuel delivery with increased air flow until the main nozzle 56 comes into operation. What has been described heretofore is merely conventional carburetor construction with high speed and low speed fuel supply circuits, both of which deliver to a mixture conduit controlled by a throttle valve. Where more than one mixture conduit is used, it will be understood that each is supplied with fuel through fuel supply circuits which may be identical with those described, or the low speed circuit, for example, may be omitted, as is often the case in the secondary stage of multi-stage carburetors.

The carburetor body and throttle body are provided with connecting air passages 71 and 75, which in turn communicate with a cross passage 73 from a single vertical pasage 72 opening in the air horn inlet passage 25 between mixture conduits 12. Only one of the passages 71 and 75 is shown, but it is understood that one is provided for each barrel. In this particular case, the separate barrels or mixture conduits 12 usually are connected to a separate manifold which has individual outlets to part of the cylinders of the internal combustion engine. Such a manifold is usually referred to as a dual manifold, and, where a single manifold is used, a single air passage is all that is necessary. The system of interconnected passages 71–75, inclusive, each extend around or by-pass the high and low speed fuel metering means in each mixture conduit 12 so that the flow through each of these sets of passages will not effect any change in the mode of operation of the high and low speed fuel circuit for each mixture conduit. In effect, each air passage is a by-pass. The passages around each mixture conduit have a single inlet solely for the purpose of providing a single metering device for controlling both, rather than two separate metering devices. This idea provides for balance between the flow in each mixture conduit 12.

The novel air flow metering device in accordance with this invention and generally indicated as 80 is shown on an enlarged scale in FIGS. 2, 3 and 4.

Referring to FIG. 2, this embodiment of the valve for metering the air flow includes a substantially T-shaped body 78 having a head 81 and an extension or leg 79. A pair of screw holes are provided in the head 81 for receiving screw 77 by which the body 78 is secured to the body of the carburetor 4. Between the screw holes is an aperture 82 dimensioned to provide a continuation of the passage 72. The upper surface of the aperture 82 is the valve seat.

The free end of the extension 79 is apertured to receive a rivet 84, and this rivet 84 securely clamps thermostatic elements with respect to and in alignment with the extension 79. In this case, two thermostatic strips of temperature responsive metals such as 86 and 94 are secured in position by the rivet 84 and a suitable clip such as 105 beneath the rivet, which has depending flanges thereon for straddling the thermostatic strips and the extension 79 so as to hold the strips in alignment therewith. The valve 87 at the opposite end of the thermostatic strip 86 has a conical face 107 for seating against the opening in the aperture 82. The opposite face of the valve 87 has a stem 108 on the end of which is a head or button 109. The button is received through the enlarged portion or hole of a keyhole slot such as 111 and then moved endwise with respect to the strip 86 so as to be loosely secured within the slot which surrounds the stem 108 of the valve 87. Dampening strip 94 has an inturned end 88 which retains the valve loosely within the slot of the keyhole opening, as will be hereinafter described. The body 78 is insulated against transfer of heat thereto from the carburetor by an insulating gasket 97.

The operation of the metering valve 87 is illustrated in FIGS. 2 and 4 which show alternative positions of the valve closed in FIG. 2 and open in FIG. 4 in response to high inlet air temperatures in the air inlet 25 of the air horn 29. The increase in temperature causes the valve to be moved away from its seat by the thermostatic strips.

In order to dampen the movement of the thermostatic strip 86 and prevent vibration and noise due to the rush of air past the valve, the metering device 80 has, as heretofore mentioned, the bridge or dampening member 94. The two members 86 and 94 are tensioned by the rivet 84, tending to hold the strips in face-to-face engagement, the inturned end 88 acting as a spacer and tensioning means in this assembly.

As stated in the prior application, valve body 79 should be of low heat conductivity material, possibly steel, which is insulated from the carburetor body so that the thermostatic members are responsive directly to changes in air temperature only.

It will be understood, however, that since the valve 87 is supported primarily on resilient members, the movement of the valve will be influenced somewhat by the pressure drop across the valve seat 82 so that the valve will have a tendency to open as the pressure drop decreases. It follows that the valve will respond to changes in altitude. One of the indications of a rough idling operation is low manifold suction; consequently, when this occurs the valve 87 will move slightly off the seat because of the decrease in pressure drop, whereby the engine will speed up, and this can occur in almost any engine temperature except when the valve 87 is tightly held against its seat by tension in the thermostatic elements 86 and 94. In the normal operating temperature range, should the engine speed drop below normal idle speed, this will be reflected by a decrease in engine manifold suction sufficient to permit the valve 87 to open slightly, leaning out the mixture and increasing engine speed.

When manifold suction is restored, the valve will tend to close again to an equilibrium position, so that a stable engine idle speed will be reached and maintained.

The valve assembly is calibrated to open at temperatures slightly above normal air temperature, for example, if the normal operating air temperature is 130°, the valve assembly should open between 140° and 150°. The amount of opening of the valve increases with an increase in air temperature and also, as above stated, with a decrease in pressure drop and, because of the frusto-conical shape of the valve, the amount of air entering the mixture conduit through the passage is metered. The frusto-conical valve also prevents a snap or pop opening of the valve which would result in irregular engine operation.

It has been found desirable to form the frusto-conical cone face of the valves 87 and 107 with an interior angle of about 50°. When the valve is open, the metering of air through the hole 82 is controlled in part by the length of the frusto-conical valve. Shortening the valve increases the flow of air into the passage. The frusto-conical shape of the valve permits slow valve opening without any substantial or noticeable increase in engine speed. In other words, the effect on engine operation is gradual. The valve material is preferably brass.

Both the dampening member or bridge 88 and the actuating arm 94 should be of the same bi-metallic material in order to function properly; otherwise, one would open more rapidly than the other and the dampening effect of the member 94 would be lost.

The location of the valve assembly 80 should be such as to indicate or respond to the temperature of the air entering the carburetor; otherwise, the particular location is not important, except for purposes of accessibility and service. Usually, the valve is placed as indicated, directly between the two mixture conduits 12 in the dual carburetor. In the four-bore or four-barrel carburetor, the location would be similar, but on either side, either the primary or the secondary side.

In this application the valve assembly 80 is of simplified construction, which construction is deemed to be an improvement over that shown in my prior application.

Accordingly, the simplified construction contemplates a tapered valve with a conical face such as 105, a stem 108, and a button 109. The thermostatic strip 86 has a keyhole aperture 111, the enlarged part of which is sufficient in diameter to receive the button 109, and the narrow part of which loosely receives and retains the stem 108. The dampening strip 94 has a dual function, not only of eliminating possible vibrations, but also of retaining the conical valve 87 within the keyhole slot 111. To obtain this object, the length of the dampening strip 94 is so related to the length of the thermostatic strip 86 that, when assembled, the inturned end 88, which acts as the spacer, closely abuts the outer circumference of the conical valve 87, so that, once the valve is positioned within the narrow portion of the keyhole slot, and the two strips 86 and 94 are riveted to the T-shaped body 78, the stem of the valve 87 will be loosely retained within the narrow portion of the keyhole slot. This particular arrangement provides the necessary movement of the stem 108 within the keyhole slot so as to center the conical valve on its seat 82. At the same time, it eliminates "prior" fastening means on the end of the stem 108 such as heretofore used, which add to problems in assembly to control the variable tensions between the valve and the strip which are possible. This simple and improved assembly is much more easily produced, and has much more uniform action.

A structure has been described which will fulfill all of the objects of the invention, but it is contemplated that other modifications will occur to those skilled in the art which come within the terms of the following claims.

I claim:

1. For a carburetor having a hot idle compensator air passage, a valve assembly comprising a valve mounting member, a valve seat in said member adapted to form a part of said air passage, a tapered metering valve on said valve seat to control the flow through said air passage, a strip of thermal responsive metal secured at one end to said mounting member and formed at the other end thereof with a connected hole and slot, said valve having a headed stem receivable through said hole and positioned in said slot for retaining said valve on said strip, and a second metal strip fixed to said thermal responsive strip and having a portion thereof extending across said hole adjacent to said valve when said headed stem is positioned within said slot for maintaining said valve stem within said slot.

2. For a carburetor having a hot idle compensator air passage, a valve assembly comprising a valve mounting member, a valve seat in said member adapted to form a part of said air passage, a tapered metering valve on said valve seat to control the flow through said air passage, a first strip of thermal responsive metal secured at one end to said mounting member and formed at the other end thereof with a connected hole and slot, said valve having a headed stem receivable through said hole and positioned in said slot for retaining said valve on said first strip, and a second thermal responsive metal strip fixed to said first thermal responsive strip and having a portion thereof extending across said hole closely spaced from said valve when said headed stem is positioned within said slot for maintaining said valve stem within said slot.

3. For a carburetor having a hot idle compensator air passage, a valve assembly comprising a valve mounting member, a valve seat in said member adapted to form a part of said air passage, a tapered metering valve on said valve seat to control the flow through said air passage, a first strip of thermal responsive metal secured at one end to said mounting member and formed at the other end thereof with a connected hole and slot, said valve having a headed stem receivable through said hole and positioned in said slot for retaining said valve on said first strip, and a second thermal responsive metal strip fixed at one end thereof to said mounting member and having the other end thereof abutting said first thermal responsive strip, said other abutting end of said second thermal responsive strip extending across said hole and closely spaced from said valve when said headed stem is positioned within said slot for maintaining said valve stem within said slot.

4. For a carburetor having a hot idle compensator air passage, a valve assembly comprising an elongated valve mounting member, a valve seat in said member adjacent one end thereof and adapted to form a part of said air passage, a tapered metering valve on said valve seat to control the flow through said air passage, a pair of metal strips of unequal length constructed of resilient thermal responsive metal positioned in face-to-face relation and each secured at one end thereof to the opposite end of said mounting member with the longer one of said strips extending over and beyond the other in the direction of said valve seat, said longer strip having a connected hole and slot in the other end thereof, said valve having a headed stem receivable by said hole and positioned in said slot for retaining said valve on said strip, the shorter one of said strips having its other end forcibly abutting said longer strip and extending across sad hole closely adjacent to said valve when said valve stem is positioned within said slot for maintaining said valve stem within said slot and for dampening movements of the longer strip.

5. For a carburetor having a hot idle compensator air passage, a valve assembly comprising an elongated metal valve mounting member, a valve seat in said member adjacent one end thereof and adapted to form a part of said air passage, a tapered metering valve on said valve seat to control the flow through said air passage, a pair of metal strips of unequal length constructed of resilient thermal responsive metal positioned in face-to-face relation and each secured at one end thereof to the opposite end of said mounting member with the longer one of said strips extending over and beyond the other in the direction of said valve seat, said longer strip having a connected hole and slot in the other end thereof, said valve having a headed stem receivable by said hole and positioned in said slot for retaining said valve on said strip, the shorter one of said strips having its other end forcibly abutting said longer strip and extending across said hole closely adjacent to said valve when said valve stem is positioned within said slot for maintaining said valve stem within said slot and for dampening movements of the longer strip, and means at said one mounting member end to mount said member on said carburetor with said opposite mounting member end free and unsupported.

6. A valve assembly comprising an elongated metal valve mounting member having adjacent one end thereof an aperture therethrough and a valve seat formed around said aperture and adapted to form a part of an air passage, a tapered metering valve on said valve seat to control the flow through said air passage, a pair of metal strips of unequal length constructed of resilient thermal responsive metal positioned in face-to-face relation and aligned with said elongated mounting member, and means fixing said pair of strips at one end thereof to the other end of said mounting member with the longer one of said strips extending over and beyond the other in the direction of said valve seat, said longer strip having a connected hole and slot in the other end thereof, said valve having a headed stem receivable by said hole and positioned in said slot for retaining said valve on said strip, the shorter one of said strips having its other end forcibly abutting said longer strip and extending across said hole and positioned closely adjacent to said valve when said valve stem is positioned within said slot for maintaining said valve stem within said slot and for dampening movements of the longer strip.

7. A valve assembly comprising an elongated metal valve mounting member having adjacent one end thereof an aperture therethrough and a valve seat formed around said aperture and adapted to form a part of an air passage, a tapered metering valve on said valve seat to control the flow through said air passage, a pair of metal strips of unequal length constructed of resilient thermal responsive metal positioned in face-to-face relation and aligned with said elongated mounting member, means fixing said pair of strips at one end thereof to the other end of said mounting member with the longer one of said strips extending over and beyond the other in the direction of said valve seat, said longer strip having a connected hole and slot in the other end thereof, said valve having a headed stem receivable by said hole and positioned in said slot for retaining said valve on said strip, the shorter one of said strips having its other end forcibly abutting said longer strip and extending across said hole and positioned closely adjacent to said valve when said valve stem is positioned within said slot for maintaining said valve stem within said slot and for dampening movements of the longer strip, and means at said one mounting member end to mount said member on a support with said opposite mounting member end free and unsupported.

References Cited in the file of this patent

UNITED STATES PATENTS

| 800,323 | Roys | Sept. 26, 1905 |
| 1,576,057 | Liefke | Mar. 9, 1926 |
| 2,268,857 | Dooley | Jan. 6, 1942 |
| 2,311,465 | Parker | Feb. 16, 1943 |
| 2,469,038 | Winkler | May 3, 1949 |
| 2,675,792 | Brown et al. | Apr. 20, 1954 |
| 2,677,937 | Jones | May 11, 1954 |